US012732307B2

(12) United States Patent
Zhang et al.

(10) Patent No.: US 12,732,307 B2
(45) Date of Patent: Sep. 8, 2026

(54) METHOD, DEVICE AND COMPUTER STORAGE MEDIUM OF COMMUNICATION

(71) Applicant: NEC CORPORATION, Tokyo (JP)

(72) Inventors: Xiaohong Zhang, Beijing (CN); Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 314 days.

(21) Appl. No.: 18/571,466

(22) PCT Filed: Jun. 18, 2021

(86) PCT No.: PCT/CN2021/100909
§ 371 (c)(1),
(2) Date: Dec. 18, 2023

(87) PCT Pub. No.: WO2022/261942
PCT Pub. Date: Dec. 22, 2022

(65) Prior Publication Data
US 2024/0291594 A1 Aug. 29, 2024

(51) Int. Cl.
*H04L 1/1812* (2023.01)
*H04L 1/00* (2006.01)
*H04L 1/1607* (2023.01)
*H04W 72/04* (2023.01)
*H04W 72/21* (2023.01)

(52) U.S. Cl.
CPC .......... *H04L 1/1671* (2013.01); *H04W 72/04* (2013.01); *H04W 72/21* (2023.01)

(58) Field of Classification Search
None
See application file for complete search history.

(56) References Cited

U.S. PATENT DOCUMENTS

2019/0261361 A1* 8/2019 Xiong .................. H04W 72/02
2019/0261391 A1* 8/2019 Kundu ................. H04L 1/0073
2021/0105766 A1* 4/2021 Wang .................. H04W 72/21
2021/0211241 A1* 7/2021 Xiong .................. H04L 1/1819
(Continued)

FOREIGN PATENT DOCUMENTS

CN 109327300 A 2/2019
CN 111865506 A 10/2020
WO 2014/019630 A1 2/2014

OTHER PUBLICATIONS

Communication dated Jun. 17, 2025 issued by the Japanese Patent Office in application No. 2023-578009.
(Continued)

*Primary Examiner* — Sai Aung
(74) *Attorney, Agent, or Firm* — Sughrue Mion, PLLC

(57) ABSTRACT

Embodiments of the present disclosure relate to methods, devices and computer readable media for communication. A terminal device receives, from a network device, an indication on whether one of a first mode and a second mode of PUCCH carrier switching is enabled, the first mode being based on a dynamic configuration in DCI, the second mode being based on an RRC configuration; and in accordance with a determination that the one of the first mode and the second mode is enabled, perform the PUCCH carrier switching for a PUCCH transmission to be processed. In this way, PUCCH carrier switching may be flexibly configured.

4 Claims, 9 Drawing Sheets

(56) References Cited

U.S. PATENT DOCUMENTS

2022/0085925 A1* 3/2022 Gao ...................... H04L 5/0053
2022/0399978 A1* 12/2022 Gao ...................... H04L 5/0055
2022/0407657 A1* 12/2022 Gao ...................... H04L 5/0044
2023/0007648 A1* 1/2023 Li ....................... H04W 72/044
2023/0064087 A1* 3/2023 Yin ...................... H04L 1/1854

OTHER PUBLICATIONS

CATT, "UE feedback enhancements for HARQ-ACK", 3GPP TSG RAN WG1 #104b-e, e-Meeting, Apr. 12-20, 2021, R1-2102628, 11 pages total.
Panasonic, "Discussion on UE feedback enhancements for HARQ-ACK", 3GPP TSG RAN WG1 #104bis-e, e-Meeting, Apr. 12-20, 2021, R1-2103205, pp. 1-7.
RAN2, "LS on R16 V2X for PUCCH reporting and for minimum time gap", 3GPP TSG RAN WG1 #105-e, e-Meeting, May 10-27, 2021, R1-2104559, 3 pages total.
"RAN2 impact to support cross-carrier scheduling with different numerologies", 3GPP TSG-RAN2 Meeting #107bis, 2019, 7 pages, Huawei, HiSilicon.
International Search Report of PCT/CN2021/100909 dated Feb. 28, 2022 [PCT/ISA/210].
Written Opinion of PCT/CN2021/100909 dated Feb. 28, 2022 [PCT/ISA/237].

* cited by examiner

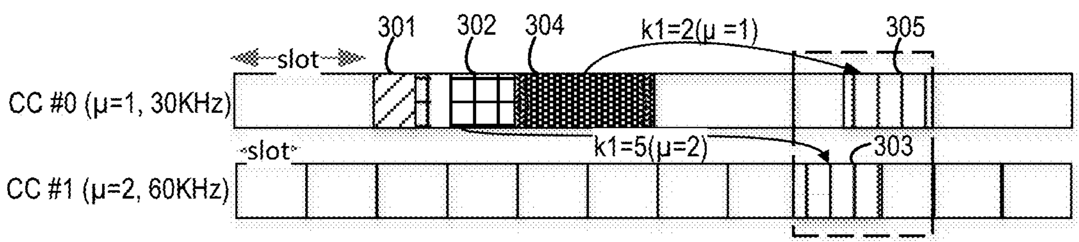
FIG. 3
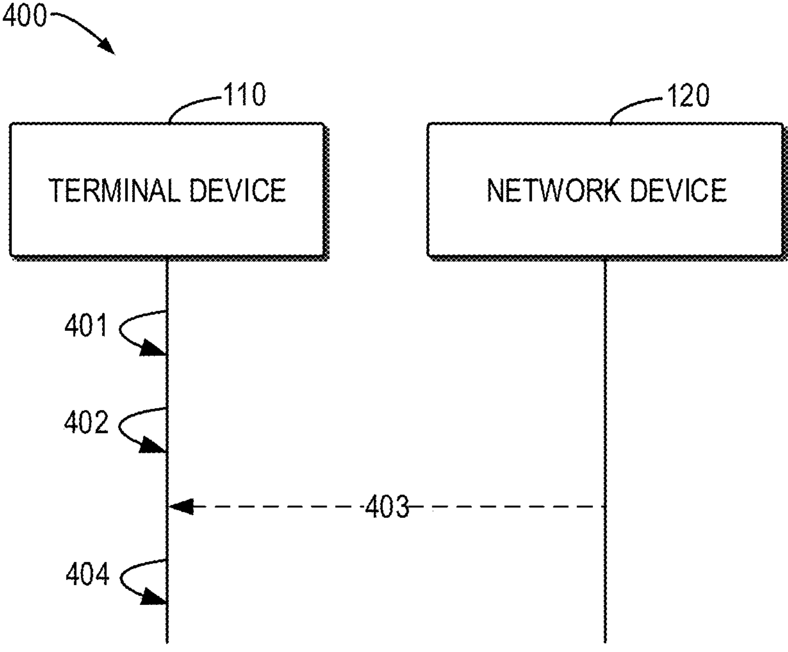
FIG. 4

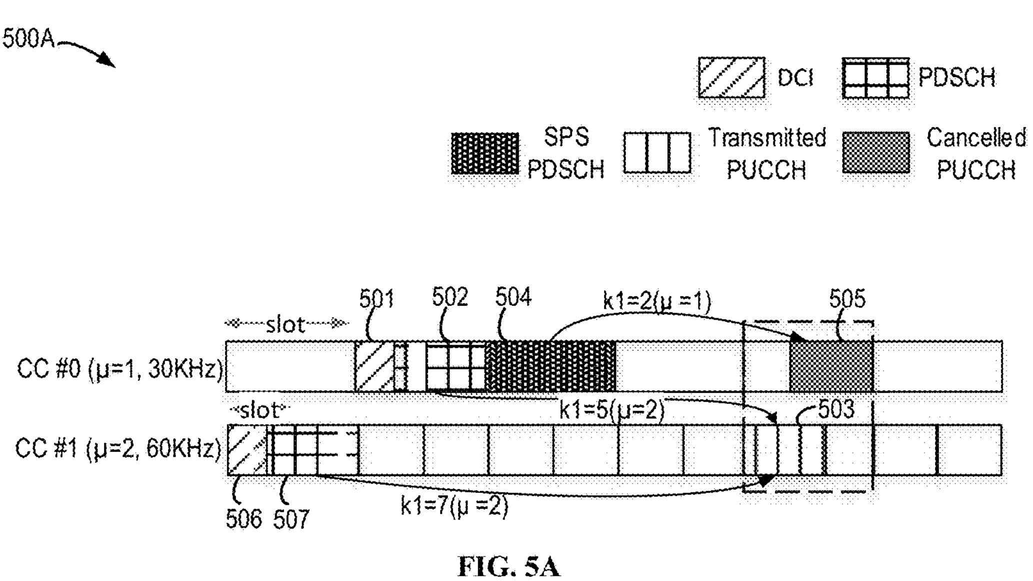

| A/N position k1=7 CC#0 | A/N position k1=5 CC#0 | A/N position k1=3 CC#0 | A/N position k1=7 CC#1 | A/N position k1=5 CC#1 | A/N position k1=3 CC#1 | A/N position for SPS PDSCH |
|---|---|---|---|---|---|---|
| NACK | A/N value of PDSCH #1 | NACK | A/N value of PDSCH #2 | NACK | NACK | A/N value of SPS PDSCH |

| A/N position k1=7 CC#0 | A/N position k1=5 CC#0 | A/N position k1=3 CC#0 | A/N position k1=7 CC#1 | A/N position k1=5 CC#1 | A/N position k1=3 CC#1 |
|---|---|---|---|---|---|
| NACK | A/N value of PDSCH #1 | A/N value of SPS PDSCH | A/N value of PDSCH #2 | NACK | NACK |

910
RECEIVE, AT A TERMINAL DEVICE AND FROM A NETWORK DEVICE, AN INDICATION ON WHETHER ONE OF A FIRST MODE AND A SECOND MODE OF PUCCH CARRIER SWITCHING IS ENABLED

920
IS ONE OF THE FIRST MODE AND THE SECOND MODE ENABLED?

YES

930
PERFORM THE PUCCH CARRIER SWITCHING FOR A PUCCH TRANSMISSION TO BE PROCESSED

METHOD, DEVICE AND COMPUTER STORAGE MEDIUM OF COMMUNICATION

CROSS REFERENCE TO RELATED APPLICATIONS

This application is a National Stage of International Application No. PCT/CN2021/100909 filed on Jun. 18, 2021.

TECHNICAL FIELD

Embodiments of the present disclosure generally relate to the field of telecommunication, and in particular, to methods, devices and computer storage media of communication for hybrid automatic repeat request (HARQ) feedback.

BACKGROUND

In new radio (NR) Release 16, for a terminal device configured with carrier aggregation (CA), only an uplink (UL) carrier of a component carrier (CC) is configured to transmit a physical uplink control channel (PUCCH) for HARQ feedback within a cell group, also called PUCCH group, e.g., primary cell.

In NR Release 17, in order to reduce a latency of HARQ feedback for downlink (DL) heavy configurations in unpaired spectrum, PUCCH carrier switching for HARQ feedback is proposed to allow more than one UL carrier with different time division duplexing (TDD) configurations for PUCCH transmission for HARQ feedback. That means a set of cells can be configured for PUCCH transmission within a PUCCH group, and then the PUCCH for HARQ-ACK transmission can be switched among the set of cells. It is agreed to support PUCCH carrier switching based on dynamic indication in downlink control information (DCI) scheduling a PUCCH and semi-static configuration. However, implementations for the PUCCH carrier switching are incomplete.

SUMMARY

In general, embodiments of the present disclosure provide methods, devices and computer storage media of communication for HARQ feedback.

In a first aspect, there is provided a method of communication. The method comprises: receiving, at a terminal device and from a network device, an indication on whether one of a first mode and a second mode of PUCCH carrier switching is enabled, the first mode being based on a dynamic configuration in DCI, the second mode being based on an radio resource control (RRC) configuration; and in accordance with a determination that the one of the first mode and the second mode is enabled, perform the PUCCH carrier switching for a PUCCH transmission to be processed.

In a second aspect, there is provided a method of communication. The method comprises: transmitting, at a network device and to a terminal device, an indication on whether one of a first mode and a second mode of PUCCH carrier switching is enabled for the terminal device, the first mode being based on a dynamic configuration in DCI, the second mode being based on an RRC configuration.

In a third aspect, there is provided a method of communication. The method comprises: in accordance with a determination that a first PUCCH transmission on a first cell is collided with a second PUCCH transmission on a second cell in time domain, performing at least one of the first PUCCH transmission or the second PUCCH transmission, the first PUCCH transmission being for a first HARQ feedback for a set of first PDSCH transmissions that are dynamically scheduled, the second PUCCH transmission being for a second HARQ feedback for a set of second PDSCH transmissions that are semi-persistently scheduled.

In a fourth aspect, there is provided a method of communication. The method comprises: transmitting, at a network device and to a terminal device, an indication for performing at least one of a first PUCCH transmission on a first cell or a second PUCCH transmission on a second cell, the first PUCCH transmission on the first cell being collided with the second PUCCH transmission on the second cell in time domain, the first PUCCH transmission being for a first HARQ feedback for a set of first PDSCH transmissions that are dynamically scheduled, the second PUCCH transmission being for a second HARQ feedback for a set of second PDSCH transmissions that are semi-persistently scheduled.

In a fifth aspect, there is provided a method of communication. The method comprises: receiving, at a terminal device and from a network device, a configuration for dynamic carrier switch and semi-persistent scheduling (SPS) HARQ deferral for the terminal device; and in accordance with a determination that a third PUCCH transmission on a third cell is collided with a downlink transmission/symbol and a fourth PUCCH transmission on a fourth cell is overlapped with the third PUCCH transmission on the third cell in time domain, the third PUCCH transmission being for a third HARQ feedback for a set of third PDSCH transmissions that are semi-persistently scheduled, the fourth PUCCH transmission being for a fourth HARQ feedback for a set of fourth PDSCH transmissions that are dynamically scheduled, handling the third PUCCH transmission by one of the following: multiplexing the third HARQ feedback onto the fourth PUCCH transmission while cancelling the third PUCCH transmission; or delaying the third HARQ feedback to a fifth PUCCH transmission on the third cell, the fifth PUCCH transmission being available.

In a sixth aspect, there is provided a method of communication. The method comprises: transmitting, at a network device and to a terminal device, an indication indicating whether multiplexing or delaying is applied when a third PUCCH transmission on a third cell is collided with a downlink transmission/symbol and a fourth PUCCH transmission on a fourth cell is overlapped with the third PUCCH transmission on the third cell in time domain in case that dynamic carrier switch and SPS HARQ deferral are configured for the terminal device, the third PUCCH transmission being for a third HARQ feedback for a set of third PDSCH transmissions that are semi-persistently scheduled, the fourth PUCCH transmission being for a fourth HARQ feedback for a set of fourth PDSCH transmissions that are dynamically scheduled, wherein the multiplexing comprises multiplexing the third HARQ feedback onto the fourth PUCCH transmission while cancelling the third PUCCH transmission, and the delaying comprises delaying the third HARQ feedback to a fifth PUCCH transmission on the third cell, the fifth PUCCH transmission being available.

In a seventh aspect, there is provided a terminal device. The terminal device comprises a processor configured to perform the method according to the first, third or fifth aspect of the present disclosure.

In an eighth aspect, there is provided a network device. The network device comprises a processor configured to perform the method according to the second, fourth or sixth aspect of the present disclosure.

In a ninth aspect, there is provided a computer readable medium having instructions stored thereon. The instructions, when executed on at least one processor, cause the at least one processor to perform the method according to the first, third, or fifth aspect of the present disclosure.

In a tenth aspect, there is provided a computer readable medium having instructions stored thereon. The instructions, when executed on at least one processor, cause the at least one processor to perform the method according to the second, fourth or sixth aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 3 illustrates a schematic diagram illustrating an example scenario of a collision between a PUCCH resource for a dynamic scheduling (DG) HARQ-acknowledgement (HARQ-ACK) and that for a semi-persistent scheduling (SPS) HARQ-ACK according to embodiments of the present disclosure;

FIG. 4 illustrates a flow chart illustrating a process of communication for HARQ feedback according to embodiments of the present disclosure;

FIG. 5A illustrates a schematic diagram illustrating an example of handling the collision between the PUCCH resource for the DG HARQ-ACK and that for the SPS HARQ-ACK according to embodiments of the present disclosure;

FIG. 5B illustrates a schematic diagram illustrating an example determination of a Type-1 HARQ-ACK codebook according to embodiments of the present disclosure;

FIG. 5C illustrates a schematic diagram illustrating another example determination of a HARQ-ACK codebook according to embodiments of the present disclosure;

Throughout the drawings, the same or similar reference numerals represent the same or similar element.

DETAILED DESCRIPTION

Figure 1:
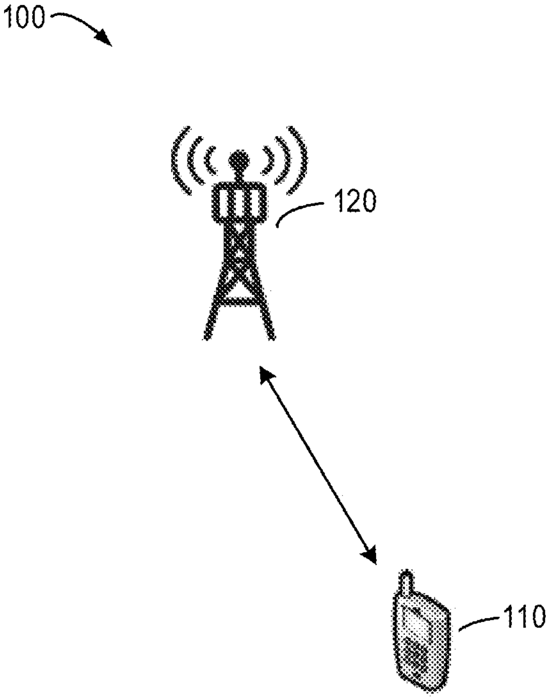
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device or the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, it is agreed to support PUCCH carrier switching based on dynamic indication in DCI scheduling a PUCCH (also referred to as a first mode herein for convenience) and PUCCH carrier switching based on a semi-static configuration (also referred to as a second mode herein for convenience). However, a joint operation of dynamic and semi-static PUCCH carrier switching needs to be studied. For example, whether the joint operation is supported, how to enable or disable the joint operation, how to handle a collision that may occur between a PUCCH resource on a first cell for DG HARQ-ACK and a PUCCH resource on a second cell for SPS HARQ-ACK, and how to handle a SPS HARQ-ACK in case that a PUCCH resource on the third cell for the SPS HARQ-ACK is unavailable and is overlapped with a PUCCH resource on the fourth cell for the DG HARQ-ACK in time domain.

In view of this, embodiments of the present disclosure provide solutions for solving the above issues or potential issues in PUCCH carrier switching. In one aspect, an indication on whether one of the first mode and the second mode of PUCCH carrier switching is enabled and how to implement PUCCH carrier switching is transmitted to a terminal device. In this way, the PUCCH carrier switching can be flexibly configured for terminal device to achieve lower HARQ-ACK latency.

In another aspect, if a PUCCH for DG HARQ-ACK on a first cell is collided with a PUCCH for SPS HARQ-ACK on a second cell in time domain, at least one of the DG HARQ-ACK or the SPS HARQ-ACK is performed. In this way, the collision may be handled.

In still another aspect, if a PUCCH resource on the third cell for a SPS HARQ-ACK is unavailable and is overlapped with a PUCCH resource on the fourth cell for a DG HARQ-ACK, the SPS HARQ-ACK is handled by one of multiplexing the SPS HARQ-ACK onto the PUCCH resource for a DG HARQ-ACK or delaying the SPS HARQ-ACK. In this way, the SPS HARQ-ACK may be efficiently transmitted.

Embodiments of the present disclosure may be applied to any suitable scenarios. For example, embodiments of the present disclosure may be implemented at ultra-reliable low latency communication (URLLC). Alternatively, embodiments of the present disclosure can be implemented in one of the followings: reduced capability NR devices, NR multiple-input and multiple-output (MIMO), NR sidelink enhancements, NR systems with frequency above 52.6 GHZ, an extending NR operation up to 71 GHz, narrow band-Internet of Thing (NB-IOT)/enhanced Machine Type Communication (eMTC) over non-terrestrial networks (NTN), NTN, UE power saving enhancements, NR coverage enhancement, NB-IOT and LTE-MTC, Integrated Access and Backhaul (IAB), NR Multicast and Broadcast Services, or enhancements on Multi-Radio Dual-Connectivity.

Principles and implementations of the present disclosure will be described in detail below with reference to the figures.

Example of Communication Network

FIG. 1 illustrates a schematic diagram of an example communication network 100 in which some embodiments of the present disclosure can be implemented. As shown in FIG. 1, the communication network 100 may include a terminal device 110 and a network device 120. In some embodiments, the terminal device 110 may be served by the network device 120. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the terminal device 110 may communicate with the network device 120 via a channel such as a wireless communication channel. The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In some embodiments, the terminal device 110 may transmit uplink data to the network device 120 via an uplink data channel transmission. For example, the uplink data channel transmission may be a physical uplink shared channel (PUSCH) transmission. Of course, any other suitable forms are also feasible.

In some embodiments, the terminal device 110 may transmit uplink control information (UCI), e.g., HARQ feedback information to the network device 120 via an uplink control channel transmission. For example, the uplink control channel transmission may be a PUCCH transmission. Of course, any other suitable forms are also feasible.

In some embodiments, the network device 120 may support a plurality of services have different priorities for the terminal device 110, for example, eMBB with a lower priority and URLLC with a higher priority. Accordingly, the terminal device 110 may perform respective uplink data and/or control channel transmissions for the different services. The uplink control channel transmissions may carry HARQ feedbacks for different services and the HARQ feedbacks may have different priorities corresponding to different services.

In some embodiments, the network device 120 may provide a plurality of serving cells (not shown herein) for the terminal device 110, for example, a primary cell (Pcell), a primary secondary cell (PScell), a secondary cell (Scell), a special cell (sPCell) or the like. Each of the serving cells may correspond to a CC. The terminal device 110 may perform transmission with the network device 120 via a CC. Of course, the terminal device 110 may perform transmission with the network device 120 via multiple CCs, for example, in case of CA.

In some scenarios, a cell group is provided by the network device 120 to the terminal device 110. At least one cell within the cell group is configured with UL carrier for PUCCH transmission for HARQ-ACK of PDSCH receptions on all cells in the cell group. In this case, PUCCH transmission for HARQ feedback may be performed on a cell with early available UL symbols within the at least one cell, then the low HARQ-ACK feedback latency can be achieved. The switching of PUCCH cell within the cell group may be called as PUCCH carrier switching.

In some embodiments, the PUCCH carrier switching may be performed based on dynamic indication. That is, when a set of cells are configured for PUCCH transmission for UE, UE determines a cell from the set of cells for PUCCH transmission for HARQ-ACK by the indication of the scheduling DCI associated with the HARQ-ACK, which is called as the first mode herein for convenience. In some embodiments, the PUCCH carrier switching may be performed based on a radio resource control (RRC) configuration. That is, when a set of cells are configured for PUCCH transmission for UE, UE firstly determines the slot or sub-slot for PUCCH transmission based on HARQ-ACK timing k1 with a reference numerology, and the reference numerology may be associated with the largest subcarrier space, the numerology of Pcell, or configured by RRC. Then UE determines a cell from the set of cells for PUCCH transmission within the slot or sub-slot for HARQ-ACK based on the RRC configured PUCCH cell timing pattern for mapping between slot or sub-slot index and PUCCH cell index, which is called as the second mode herein for convenience.

Example Implementation of Joint Operation of First and Second Modes

Figure 2:
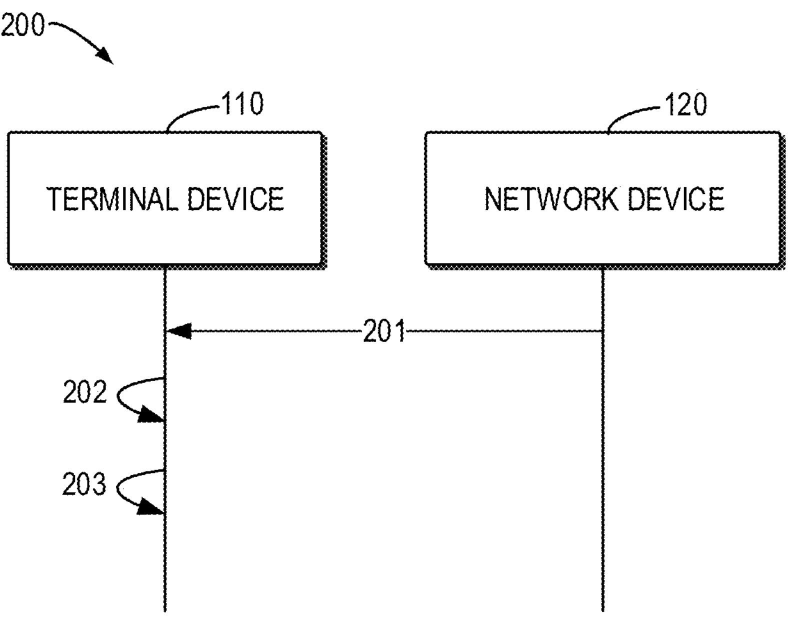
FIG. 2 illustrates a flow chart illustrating a process of communication for PUCCH carrier switching according to embodiments of the present disclosure.

FIG. 2 illustrates a flow chart illustrating a process 200 of communication for PUCCH carrier switching according to embodiments of the present disclosure. For the purpose of discussion, the process 200 will be described with reference to FIG. 1. The process 200 may involve the terminal device 110 and the network device 120 as illustrated in FIG. 1.

As shown in FIG. 2, the network device 120 transmits 201 an indication whether one of a first mode and a second mode of PUCCH carrier switching is enabled. The first mode is based on a dynamic configuration in DCI, and the second mode is based on an RRC configuration.

The terminal device 110 determines 202 whether the one of the first mode and the second mode is enabled based on the first indication. If determining that the one of the first mode and the second mode is enabled, the terminal device 110 performs 203 the PUCCH carrier switching for a PUCCH transmission to be processed.

In this way, the PUCCH carrier switching may be flexibly configured. For illustration, more detailed description will be given in connection with Embodiments 1-4.

Embodiment 1

In this embodiment, the indication indicates at least one of the following: the first mode is enabled; the second mode is enabled; or the first and second modes are simultaneously disabled. In other words, only one of the first and second modes is enabled for the terminal device 110 in a given time.

In some embodiments, the indication may be a RRC parameter, for example, denoted as pucchCarrierIndication. For example, pucchCarrierIndication={disabled; semiStatic; dynamic}.

In some embodiments, if the first mode is enabled and the PUCCH transmission is dynamically scheduled, the terminal device 110 may perform the PUCCH carrier switching for the PUCCH transmission in the first mode. For example, In case pucchCarrierIndication is configured as dynamic, the first mode that PUCCH carrier switching based on dynamic indication in DCI will be applied for dynamic scheduled PUCCH, e.g., DG HARQ-ACK.

In some embodiments, if the first mode is enabled and the PUCCH transmission is semi-statically configured, the terminal device 110 may perform no PUCCH carrier switching for the PUCCH transmission. For example, if pucchCarrierIndication is configured as dynamic, PUCCH carrier for SPS HARQ-ACK follows the default configuration, e.g., Pcell.

In some embodiments, if the second mode is enabled and the PUCCH transmission is dynamically scheduled or semi-statically configured, the terminal device 110 may perform the PUCCH carrier switching for the PUCCH transmission in the second mode. For example, if pucchCarrierIndication is configured as semiStatic, the second mode that PUCCH carrier switching is based on RRC configured PUCCH cell timing pattern will be applied for both dynamic scheduled PUCCH and configured PUCCH, e.g., PUCCH for DG HARQ-ACK transmission and SPS HARQ-ACK transmission.

In some embodiments, if the first mode and second mode are simultaneously disabled, the terminal device 110 may perform no PUCCH carrier switching for the PUCCH transmission to be processed. For example, if pucchCarrierIndication is configured as disabled, the PUCCH carrier switching will not be applied.

Embodiment 2

In this embodiment, the indication indicates at least one of the following: the first and second modes are simultaneously enabled; or the first and second modes are simultaneously disabled. In other words, the first and second modes are simultaneously enabled or disabled for the terminal device 110 in a given time.

In some embodiments, the indication may be a RRC parameter, for example, denoted as pucchCarrierSwitching. For example, pucchCarrierSwitching={disabled; enabled}.

In some embodiments, if the PUCCH transmission is dynamically scheduled, the terminal device 110 may perform the PUCCH carrier switching for the PUCCH transmission in the first mode. For example, if pucchCarrierSwitching is configured as enabled, the first mode that PUCCH carrier switching based on dynamic indication in DCI will be applied for dynamic scheduled PUCCH.

In some embodiments, if the PUCCH transmission is semi-statically configured, the terminal device 110 may perform the PUCCH carrier switching for the PUCCH transmission in the second mode. For example, if pucchCarrierSwitching is configured as enabled, the second mode that PUCCH carrier switching is based on RRC configured PUCCH cell timing pattern will be applied for configured PUCCH.

In some embodiments, if the first mode and second mode are simultaneously disabled, the terminal device 110 may perform no PUCCH carrier switching for the PUCCH transmission to be processed. For example, if pucchCarrierSwitching is configured as disabled, the PUCCH carrier switching will not be applied.

Embodiment 3

In this embodiment, the indication comprises a first indication and a second indication. The first indication indicates at least one of the following: at least one of the first mode or the second mode is enabled; or the first and second modes are simultaneously disabled. The second indication indicates at least one of the following: the first mode is enabled; the second mode is enabled; or the first and second modes are simultaneously enabled. In other words, the first and second modes may be simultaneously enabled or disabled or may be separately enabled or disabled for the terminal device 110 in a given time.

In some embodiments, the first and second indications may be RRC parameters, for example, denoted as pucchCarrierSwitching and pucchCarrierIndication respectively. For example, pucchCarrierSwitching={enabled; disabled}, and pucchCarrierIndication={semiStatic; dynamic; semiStatic&dynamic}.

In some embodiments, if the first indication indicates that at least one of the first mode or the second mode is enabled and the second indication indicates that the first mode or the second mode is applied, for example, pucchCarrierSwitching={enabled} and pucchCarrierIndication={semiStatic} or {dynamic}, the terminal device 110 may perform similar operations as that described in Embodiment 0. For example, if the first mode is enabled and the PUCCH transmission is dynamically scheduled, the terminal device 110 may perform the PUCCH carrier switching for the PUCCH transmission in the first mode. If the first mode is enabled and the PUCCH transmission is semi-statically configured, the terminal device 110 may perform no PUCCH carrier switching for the PUCCH transmission. If the second mode is enabled, the terminal device 110 may perform the PUCCH carrier switching for the PUCCH transmission in the second mode.

In some embodiments, if the first indication indicates that at least one of the first mode or the second mode is enabled and the second indication indicates that the first and second modes are simultaneously enabled, for example, pucchCarrierSwitching={enabled} and pucchCarrierIndication={semiStatic&dynamic}, the t terminal device 110 may perform similar operations as that described in Embodiment 1. For example, if the PUCCH transmission is dynamically scheduled, the terminal device 110 may perform the PUCCH carrier switching for the PUCCH transmission in the first mode. If the PUCCH transmission is semi-statically configured, the terminal device 110 may perform the PUCCH carrier switching for the PUCCH transmission in the second mode.

In some embodiments, if the first indication indicates that the first and second modes are simultaneously disabled, for example, pucchCarrierSwitching={disabled}, the terminal device 110 may perform no PUCCH carrier switching for the PUCCH transmission to be processed.

Embodiment 4

In this embodiment, if the PUCCH transmission to be processed is dynamically scheduled in DCI format 1_0, the terminal device 110 may perform the PUCCH carrier switching for the PUCCH transmission by treating the PUCCH transmission as a semi-statically configured PUCCH transmission.

For example, if the PUCCH cell indication field is only configured in DCI format 1_1/1_2, e.g., for PUCCH carrier switching based DCI indication, one new field is introduced in DL DCI format to indicate the which PUCCH cell is for the DG HARQ-ACK, then for HARQ-ACK of PDSCH scheduled by DCI format 1_0, the PUCCH cell determination can follow the CG PUCCH for SPS HARQ-ACK in Embodiments 1-3. Other details are omitted here for concise.

According to embodiments of the present disclosure, a flexible configuration for PUCCH carrier switching may be provided for terminal devices with different capabilities.

Example Implementation of Handling Collision Between DG HARQ-ACK and SPS HARQ-ACK In some scenarios, a PUCCH resource on the first cell for a DG HARQ-ACK may be collided with a PUCCH resource on the second cell for a SPS HARQ-ACK in time domain. For example, for a terminal device configured with more than one candidate PUCCH cells for PUCCH transmission for HARQ-ACK, PUCCH carrier switching for DG HARQ-ACK is based on dynamic indication in DCI, and PUCCH carrier switching for SPS HARQ-ACK is disabled or based on semi-static configuration. In this case, a PUCCH resource for HARQ-ACK for SPS PDSCH is configured by RRC to be transmitted in a slot on a first cell, while an earlier PUCCH resource for HARQ-ACK for dynamically scheduled PDSCH may be indicated by the DCI to be transmitted in the same slot on a second cell. FIG. 3 illustrates a schematic diagram illustrating an example scenario 300 of a collision between a PUCCH resource for a DG HARQ-ACK and that for a SPS HARQ-ACK according to embodiments of the present disclosure.

As shown in FIG. 3, CC #0 and CC #1 in a PUCCH cell group are configured for PUCCH transmission. CC #0 is configured as the target PUCCH cell for SPS HARQ-ACK, and CC #1 is indicated by scheduling DCI as the target PUCCH cell for DG HARQ-ACK. As shown in FIG. 3, DCI 301 may indicate that a DG HARQ-ACK for PDSCH 302 is transmitted by PUCCH 303 on CC #1, for example, with a HARQ-ACK timing value k1=5 (μ=2). SPS HARQ-ACK for SPS PDSCH 304 is configured to be transmitted by PUCCH 305 on CC #0, for example, with a HARQ-ACK timing value k1=2 (μ=1).

For the DG HARQ-ACK, the PDSCH to HARQ-ACK offset k1 is interpreted based on the numerology of the dynamically indicated target PUCCH CC #1. For the SPS HARQ-ACK, the PDSCH to HARQ-ACK offset k1 is interpreted based on the numerology of the configured target PUCCH CC #0. Subcarrier spacing (SCS) of CC #0 is 30 KHz (μ=1), and SCS of CC #1 is 60 KHz (μ=2).

It can be seen that the PUCCH resource (i.e., PUCCH 303) for DG HARQ-ACK and PUCCH resource (i.e., PUCCH 305) for SPS HARQ-ACK are collided with each other in time domain on different cells. However, there is no such collision case in current technology, how to handle the collision case for the terminal device is not clear now.

Embodiments of the present disclosure provide a solution for solving the above issue. This will be described in detail with reference to FIG. 4. FIG. 4 illustrates a flow chart illustrating a process 400 of communication for HARQ feedback according to embodiments of the present disclosure. For the purpose of discussion, the process 400 will be described with reference to FIG. 1. The process 400 may involve the terminal device 110 and the network device 120 as illustrated in FIG. 1.

As shown in FIG. 4, the terminal device 110 determines 401 whether a first PUCCH transmission on a first cell is collided with a second PUCCH transmission on a second cell in time domain. The first PUCCH transmission (for example, PUCCH 303) is for a first HARQ feedback (for example, DG HARQ-ACK) for a set of first PDSCH transmissions (for example, PDSCH 302) that are dynamically scheduled, and the second PUCCH transmission (for example, PUCCH 305) is for a second HARQ feedback (for example, SPS HARQ-ACK) for a set of second PDSCH transmissions (for example, SPS PDSCH 304) that are semi-persistently scheduled. In some embodiments, the number of first PDSCH transmissions in the set of first PDSCH transmissions may be an integer equal to or larger than one, and the number of second PDSCH transmissions in the set of second PDSCH transmissions may be an integer equal to or larger than one.

If determining that the first PUCCH transmission is collided with the second PUCCH transmission, the terminal device 110, the terminal device 110 performs 402 at least one of the first PUCCH transmission or the second PUCCH transmission. In some embodiments, the terminal device 110 may receive 403 from the network device 120 an indication for performing the at least one of the first PUCCH transmission or the second PUCCH transmission, and perform the at least one of the first PUCCH transmission or the second PUCCH transmission based on the indication or predetermination. In some embodiments, the indication may be provided in RRC configuration. In some embodiments, the indication may be dynamically indicated by the network device 120.

Some example embodiments for solutions on the performance of at least one of the first PUCCH transmission or the second PUCCH transmission will be detailed in connection with Embodiments 5-8. It is to be noted that solutions described in these example embodiments may be used separately or may be used in any combination thereof.

Embodiment 5

In this embodiment, the second HARQ feedback is multiplexed onto the first PUCCH transmission, and the second PUCCH transmission is cancelled. For example, the terminal device 110 may multiplex DG HARQ-ACK and SPS HARQ-ACK on a HARQ-ACK codebook and transmit the multiplexed HARQ-ACK bits on the dynamic scheduled PUCCH resource, and cancel the configured PUCCH transmission for SPS HARQ-ACK.

FIG. 5A illustrates a schematic diagram 500A illustrating an example of handling the collision between the PUCCH resource for the DG HARQ-ACK and that for the SPS HARQ-ACK according to embodiments of the present disclosure. As shown in FIG. 5A, DCI 501 may indicate that a DG HARQ-ACK for PDSCH 502 is transmitted by PUCCH 503 on CC #1, for example, with a HARQ-ACK timing value k1=5 (μ=2). SPS HARQ-ACK for SPS PDSCH 504 is configured to be transmitted by PUCCH 505 on CC #0, for example, with a HARQ-ACK timing value k1=2 (μ=1). DCI 506 may indicate that a DG HARQ-ACK for PDSCH 507 is also transmitted by PUCCH 503 on CC #1, for example, with a HARQ-ACK timing value k1=7 (μ=2).

It can be seen that PUCCH 505 on CC #0 is collided with PUCCH 503 on CC #1 in time domain. According to the first solution, the SPS HARQ-ACK for SPS PDSCH 504 may be multiplexed onto PUCCH 503. In this example, the PUCCH 503 will carry the DG HARQ-ACK for PDSCH 502, the DG HARQ-ACK for PDSCH 507 and the SPS HARQ-ACK for SPS PDSCH 504.

In some embodiments where a Type-1 codebook or Type-2 codebook is configured for the terminal device 110, the terminal device 110 may generate a first codebook for the first HARQ feedback and a second codebook for the second HARQ feedback, and append the first codebook after or before the second codebook. For example, when Type-1 codebook is configured for the terminal device 110, the HARQ-ACK codebook for SPS HARQ-ACK corresponding to CC #0 may be placed after or before the Type-1 codebook for DG HARQ-ACK corresponding to CC #1. In another example, when Type-2 codebook is configured for the terminal device 110, the HARQ-ACK codebook for SPS HARQ-ACK corresponding to CC #0 may be placed after or before the Type-2 codebook for DG HARQ-ACK corresponding to CC #1.

FIG. 5B illustrates a schematic diagram 500B illustrating an example determination of a Type-1 HARQ-ACK codebook according to embodiments of the present disclosure. As shown in FIG. 5B, a HARQ-ACK codebook 510 is generated for the DG HARQ-ACK for PDSCH 502 and PDSCH 507, and a HARQ-ACK codebook 520 is generated for the SPS HARQ-ACK for SPS PDSCH 504. The HARQ-ACK codebook 520 is placed after the HARQ-ACK codebook 510 so as to constitute the multiplexed HARQ-ACK codebook.

In some embodiments where a Type-1 codebook is configured for the terminal device 110, the terminal device 110 may determine, based on a numerology of the first cell, an offset k1' between a first slot of the first PUCCH transmission and a second slot for an ending symbol for the second PDSCH transmission. The slot also may be interpreted as the subslot. In some case, for example, the HARQ feedback may be based on the subslot-based PUCCH. For example, as shown in FIG. 5A, the terminal device 110 may determine based on a numerology of CC #1 that an offset k1' between a slot of PUCCH 503 and a reception slot (an ending symbol) of SPS PDSCH 504 is 3.

If the offset is in a set of offsets configured for the first PUCCH transmission, the terminal device 110 may generate a first codebook for the first HARQ feedback, and determine, based on the offset, a position in the first codebook. Then the terminal device 110 may place the second HARQ feedback in the position. For example, in the example of FIG. 5A, assuming that the k1 set of PUCCH CC #0 is {1, 2} and the k1 set of PUCCH CC #1 is {3, 5, 7}. It can be seen that the offset k1'=3 for SPS PDSCH is in the k1 set of PUCCH CC #1. Thus, a position in the Type-1 codebook for DG HARQ-ACK may be determined for placement of the SPS HARQ-ACK. This will be described in connection with FIG. 5C.

FIG. 5C illustrates a schematic diagram 500C illustrating another example determination of a HARQ-ACK codebook according to embodiments of the present disclosure. As shown in FIG. 5C, as the offset is 3 and SPS PDSCH is received on CC #0, a position 530 corresponding {k1=3, CC #0} is determined from the Type-1 codebook for DG HARQ-ACK to carry the SPS HARQ-ACK.

In some embodiments, if the offset is not in a set of offsets configured for the first PUCCH transmission, the terminal device 110 may drop the second HARQ feedback (for example, SPS HARQ-ACK). In some embodiments, if the offset is not in a set of offsets configured for the first PUCCH transmission, the terminal device 110 may append the second HARQ feedback (for example, SPS HARQ-ACK) after the first codebook (for example, Type-1 codebook for DG HARQ-ACK). In some embodiments, if the offset is not in a set of offsets configured for the first PUCCH transmission, the terminal device 110 may extend the set of offsets by adding the offset into the set of offsets, and UE determines the multiplexed HARQ-ACK codebook based on the extend set of HARQ-ACK timing offsets.

In some embodiments, if the multiplexing timeline for SPS HARQ-ACK multiplexed on DG PUCCH resource is not satisfied, e.g., the required shortest SPS PDSCH decoding time is not satisfied, the SPS HARQ-ACK will be dropped.

In some embodiments where Type-2 codebook is configured for the terminal device 110, the terminal device 110 may reuse the Rel-16 rule for multiplexing SPS HARQ-ACK and DG HARQ-ACK. For example, for sub-codebook for SPS HARQ-ACK only, the HARQ-ACK bits may be ordered as {lower DL slot index first, then lower SPS configuration index first, then lower DL CC index first}. Then, the sub-codebook for SPS HARQ-ACK is appended to the TB based sub-codebook for DG HARQ-ACK.

With the solution of Embodiment 5, a high spectral efficiency (SE) and lower latency may be achieved but the implementation is complicated.

Embodiment 6

In this embodiment, the first PUCCH transmission on the first cell is performed and the second PUCCH transmission on the second cell is delayed.

Figure 6:
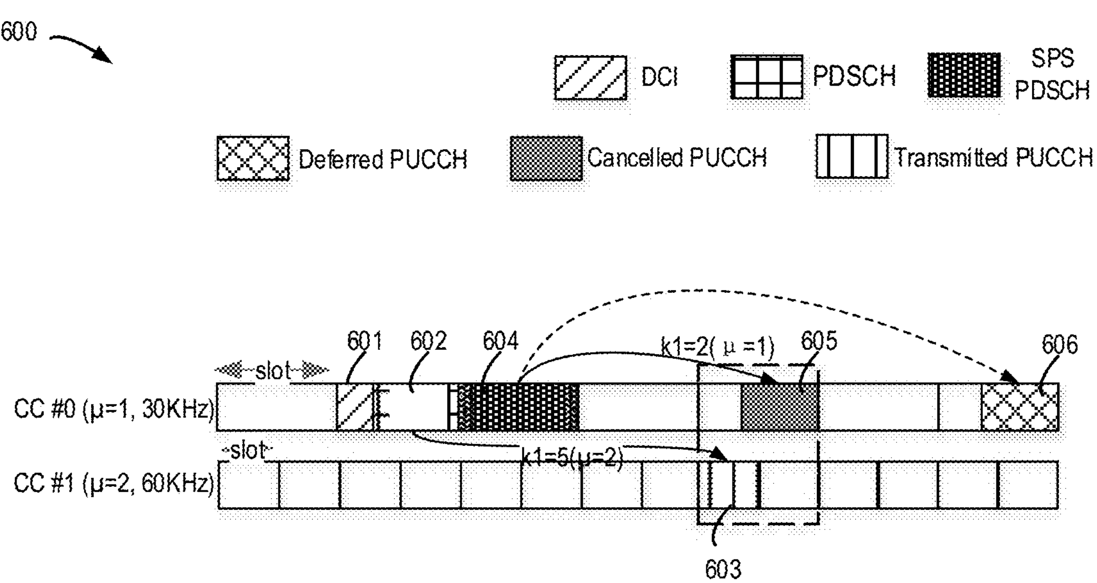
FIG. 6 illustrates a schematic diagram illustrating another example of handling the collision between the PUCCH resource for the DG HARQ-ACK and that for the SPS HARQ-ACK according to embodiments of the present disclosure.

For example, if SPS HARQ-ACK deferral is enabled, which means that when configured PUCCH resource for SPS HARQ-ACK is unavailable (which collides with semi-static DL symbols, SSB or CORESET #0), UE will delay the SPS HARQ-ACK on next available PUCCH resource based on a predefined rule, the terminal device 110 may transmit PUCCH on PUCCH CC #1 for DG HARQ-ACK and delay the PUCCH transmission on PUCCH CC #0 for SPS HARQ-ACK based on the deferral rule defined in Rel-17. Of course, the delaying may be performed in any other suitable ways. FIG. 6 illustrates a schematic diagram 600 illustrating another example of handling the collision between the PUCCH resource for the DG HARQ-ACK and that for the SPS HARQ-ACK according to embodiments of the present disclosure.

As shown in FIG. 6, DCI 601 may indicate that a DG HARQ-ACK for PDSCH 602 is transmitted by PUCCH 603 on CC #1, for example, with a HARQ-ACK timing value k1=5 (μ=2). SPS HARQ-ACK for SPS PDSCH 604 is configured to be transmitted by PUCCH 605 on CC #0, for example, with a HARQ-ACK timing value k1=2 (μ=1). It can be seen that PUCCH 603 on CC #1 and PUCCH 605 on CC #0 are collided with each other in time domain. The terminal device 110 may perform transmission of PUCCH 603, and delay the SPS HARQ-ACK to next available PUCCH 606 on CC #0.

With the solution of embodiment 6, the collision may be handled in a simple way but may lead large delay for SPS HARQ-ACK.

Embodiment 7

In this embodiment, the first PUCCH transmission on the first cell and the second PUCCH transmission on the second cell are performed simultaneously. That is, the terminal device 110 may simultaneously transmit PUCCH on PUCCH CC #0 for SPS HARQ-ACK and PUCCH on PUCCH CC #1 for DG HARQ-ACK. This solution may be adopted depending on capabilities of the terminal device 110.

With the solution of Embodiment 7, a high UE capability may be required.

Embodiment 8

In this embodiment, the terminal device 110 may determine priorities of the first and second PUCCH transmissions, and perform one of the first and second PUCCH transmissions with a higher priority while dropping the other of the first and second PUCCH transmissions with a lower priority.

For example, PUCCH on the first PUCCH cell for DG HARQ-ACK may be treated as high priority and transmitted, and PUCCH on the second PUCCH cell for SPS HARQ-ACK is treated as low priority and dropped.

With the solution of Embodiment 8, the implementation for handling the collision may be simple but may degrade the performance of SPS HARQ-ACK transmission.

In view of the above, rules are provided to handle the possible collision between the PUCCH resource on the first cell for DG HARQ-ACK and the PUCCH resource on the second cell for SPS HARQ-ACK. Further, the same understanding on HARQ-ACK codebook size is aligned between the network device and the terminal device.

Example Implementation of Transmission of SPS HARQ-ACK

In some scenarios, a PUCCH resource on the third cell for a SPS HARQ-ACK is unavailable, which collides with semi-static DL symbols, SSB or CORESET #0, and the PUCCH resource for the SPS HARQ-ACK is overlapped with a PUCCH resource on the fourth cell for a DG HARQ-ACK. Assuming that the SPS HARQ-ACK deferral is enabled. In this case, since both multiplexing rule and SPS HARQ-ACK deferral rule are enabled and can be applied for SPS HARQ-ACK, how to handle the SPS HARQ-ACK needs to be studied to eliminate the ambiguity between UE and gNB on SPS HARQ-ACK transmission.

Figure 7:
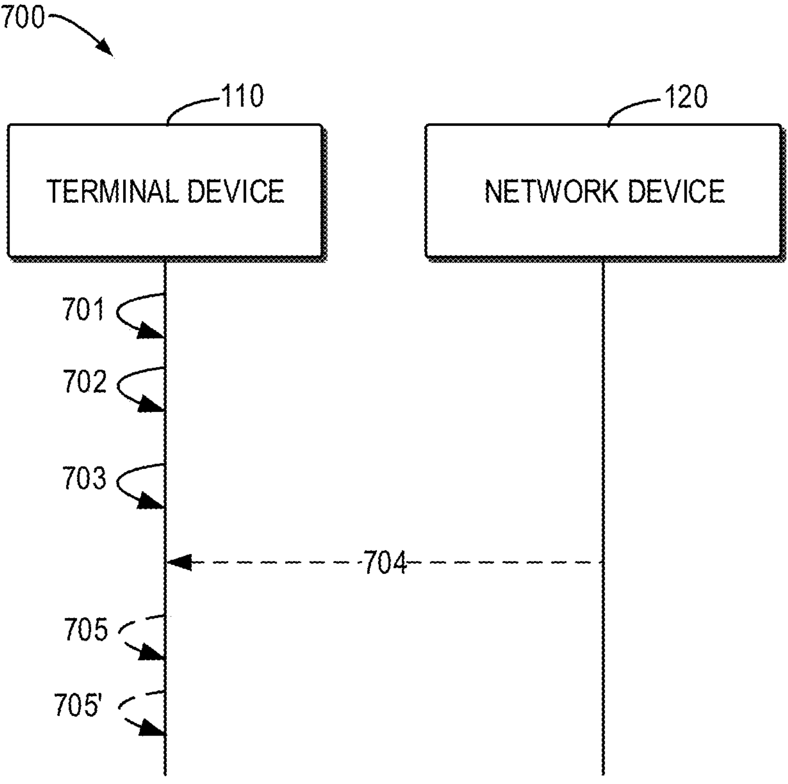
FIG. 7 illustrates a flow chart illustrating a process of communication for SPS HARQ feedback according to embodiments of the present disclosure.

In view of this, embodiments of the present disclosure provide a solution for solving the above issue. For clarity, the solution will be described in connection with FIG. 7. FIG. 7 illustrates a flow chart illustrating a process 700 of communication for SPS HARQ feedback according to embodiments of the present disclosure. For the purpose of discussion, the process 700 will be described with reference to FIG. 1. The process 700 may involve the terminal device 110 and the network device 120 as illustrated in FIG. 1. Assuming that the SPS HARQ-ACK deferral is enabled.

As shown in FIG. 7, the terminal device 110 receives 701 a configuration for dynamic carrier switch and SPS HARQ deferral for the terminal device 110.

The terminal device 110 determines 702 whether a PUCCH transmission (also referred to as a third PUCCH transmission herein) on a cell (also referred to as a third cell herein) is collided with a downlink transmission/symbol and is overlapped with another PUCCH transmission (also referred to as a fourth PUCCH transmission herein) on another cell (also referred to as a fourth cell herein) in time domain. The third PUCCH transmission is for a third HARQ feedback (for example, SPS HARQ-ACK) for a third PDSCH transmission that is semi-persistently scheduled, and the fourth PUCCH transmission is for a fourth HARQ feedback (for example, DG HARQ-ACK) for a fourth PDSCH transmission that is dynamically scheduled.

If determining that the third PUCCH transmission is collided with the downlink transmission and is overlapped with the fourth PUCCH transmission in time domain, the terminal device 110 handles 703 the third PUCCH transmission. In some embodiments, the terminal device 110 may multiplex the third HARQ feedback onto the fourth PUCCH transmission and cancel the third PUCCH transmission. In some embodiments, the terminal device 110 may delay the third HARQ feedback to a fifth PUCCH transmission on the third cell, the fifth PUCCH transmission being available. For illustration, an example will be described with reference to FIG. 8.

Figures 8, 9:
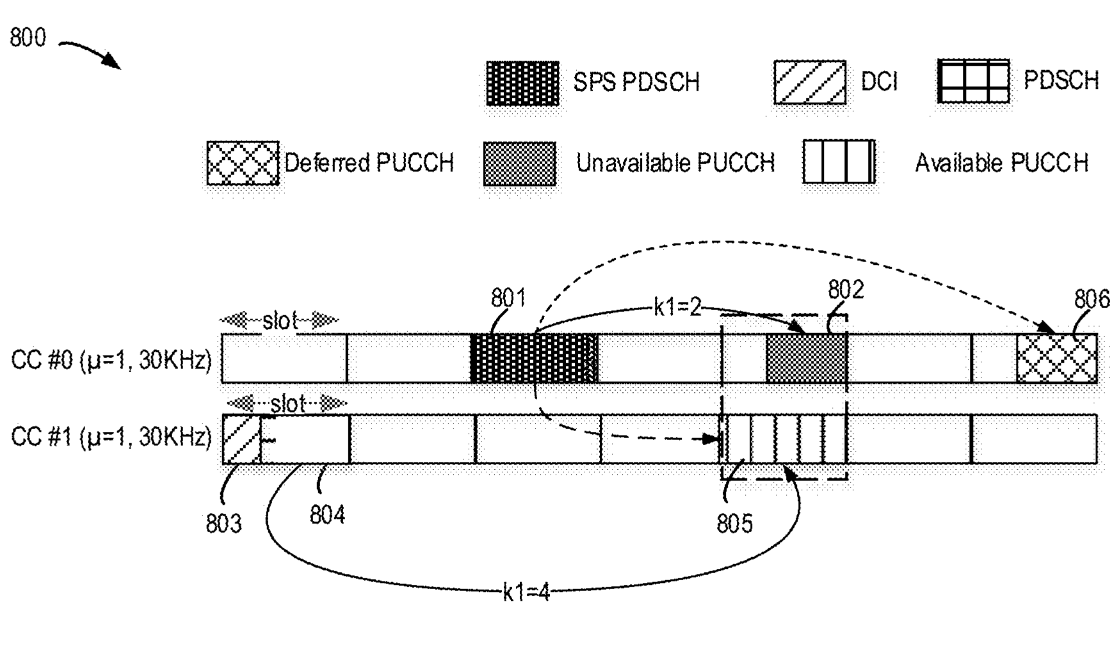
FIG. 8 illustrates a schematic diagram illustrating an example handling of a SPS HARQ-ACK in case that a PUCCH resource for the SPS HARQ ACK is unavailable and is overlapped with a PUCCH resource for a DG HARQ-ACK according to embodiments of the present disclosure.
FIG. 9 illustrates an example method of communication implemented at a terminal device in accordance with some embodiments of the present disclosure.

FIG. 8 illustrates a schematic diagram 800 illustrating an example handling of a SPS HARQ-ACK in case that a PUCCH resource for the SPS HARQ ACK is unavailable and is overlapped with a PUCCH resource for a DG HARQ-ACK according to embodiments of the present disclosure. As shown in FIG. 8, SPS HARQ-ACK for SPS PDSCH 801 is configured to be transmitted by PUCCH 802 on CC #0, for example, with a HARQ-ACK timing value k1=2. DCI 803 may indicate that a DG HARQ-ACK for PDSCH 804 is transmitted by PUCCH 805 on CC #1, for example, with a HARQ-ACK timing value k1=4.

For example, as the slot of the PUCCH 802 is a downlink slot, the PUCCH 802 is unavailable on this slot. In some embodiments, the SPS HARQ-ACK may be delayed to next available PUCCH 806 according to the SPS HARQ-ACK deferral rule. In some embodiments, the SPS HARQ-ACK on PUCCH 802 may be directly multiplexed onto PUCCH 805 and PUCCH 802 is cancelled.

Return to FIG. 7, in some embodiments, the terminal device 110 may receive 704 from the network device 120 an indication indicating whether the multiplexing or the delaying is applied. If the indication indicates that the multiplexing is applied, the terminal device 110 may handle 705 the third PUCCH transmission by multiplexing the third HARQ feedback onto the fourth PUCCH transmission and canceling the third PUCCH transmission. If the indication indicates that the delaying is applied, the terminal device 110 may handle 705' the third PUCCH transmission by delaying the third HARQ feedback to the fifth PUCCH transmission that is available on the third cell.

In some embodiments, the indication may be provided by a RRC configuration. In some embodiments, the indication may be dynamically indicated by the network device 120.

In this way, a clear rule is defined for the handling of intra-UE multiplexing and SPS HARQ-ACK deferral to ensure the alignment between the network device 120 and the terminal device 110 on SPS HARQ-ACK transmission, and then reliability performance of HARQ-ACK transmission may be guaranteed.

Example Implementation of Methods

Accordingly, embodiments of the present disclosure provide methods of communication implemented at a terminal device and a network device. These methods will be described below with reference to FIGS. 9 to 14.

FIG. 9 illustrates an example method 900 of communication implemented at a terminal device in accordance with some embodiments of the present disclosure. For example, the method 900 may be performed at the terminal device 110 as shown in FIG. 1. For the purpose of discussion, in the following, the method 900 will be described with reference to FIG. 1. It is to be understood that the method 900 may include additional blocks not shown and/or may omit some blocks as shown, and the scope of the present disclosure is not limited in this regard.

At block 910, the terminal device 110 receives, from the network device 120, an indication on whether one of a first mode and a second mode of PUCCH carrier switching is enabled, the first mode being based on a dynamic configuration in DCI, the second mode being based on an RRC configuration.

At block 920, the terminal device 110 determines whether the one of the first mode and the second mode is enabled. If the one of the first mode and the second mode is enabled, the process proceeds to block 930.

At block 930, the terminal device 110 performs the PUCCH carrier switching for a PUCCH transmission to be processed. In some embodiments, if the PUCCH transmission is dynamically scheduled, the terminal device 110 may perform the PUCCH carrier switching for the PUCCH transmission in the first mode. In some embodiments, if the PUCCH transmission is semi-statically configured, the terminal device 110 may perform the PUCCH carrier switching for the PUCCH transmission in the second mode.

In some embodiments, the terminal device 110 may receive, from the network device 120, the indication indicating at least one of the following: the first mode is enabled; the second mode is enabled; or the first and second modes are simultaneously disabled.

In some embodiments, the terminal device 110 may receive, from the network device 120, the indication indicating at least one of the following: the first and second modes are simultaneously enabled; or the first and second modes are simultaneously disabled In some embodiments, the terminal device 110 may receive, from the network device 120, the indication comprising a first indication and a second indication, wherein the first indication indicates at least one of the following: at least one of the first mode or the second mode is enabled; or the first and second modes are simultaneously disabled, and wherein the second indication indicates at least one of the following: the first mode is enabled; the second mode is enabled; or the first and second modes are simultaneously enabled.

In some embodiments, if the first mode and second mode are simultaneously disabled, the terminal device 110 may perform no PUCCH carrier switching for the PUCCH transmission to be processed.

In some embodiments, if the first mode is enabled or the second mode is enabled, the terminal device 110 may perform the following operations: in accordance with a determination that the first mode is enabled and the PUCCH transmission is dynamically scheduled, performing the PUCCH carrier switching for the PUCCH transmission in the first mode; in accordance with a determination that the first mode is enabled and the PUCCH transmission is semi-statically configured, performing no PUCCH carrier switching for the PUCCH transmission; and in accordance with a determination that the second mode is enabled and the PUCCH transmission is dynamically scheduled or semi-statically configured, performing the PUCCH carrier switching for the PUCCH transmission in the second mode.

In some embodiments, if the first and second modes are simultaneously enabled, the terminal device 110 may perform the following operations: in accordance with a determination that the PUCCH transmission is dynamically scheduled, performing the PUCCH carrier switching for the PUCCH transmission in the first mode; and in accordance with a determination that the PUCCH transmission is semi-statically configured, performing the PUCCH carrier switching for the PUCCH transmission in the second mode.

In some embodiments, if the PUCCH transmission is dynamically scheduled in DCI format 1_0, the terminal device 110 may perform the PUCCH carrier switching for the PUCCH transmission by treating the PUCCH transmission as a semi-statically configured PUCCH transmission.

Figure 10:
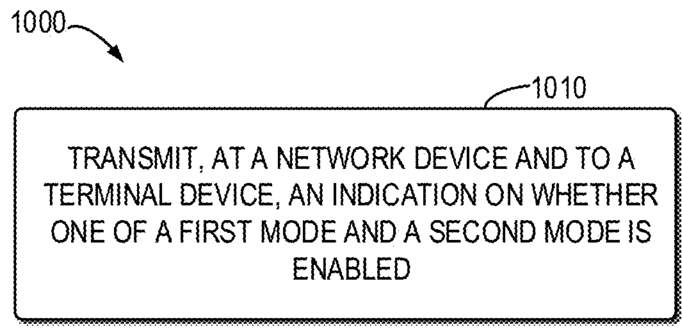
FIG. 10 illustrates an example method of communication implemented at a network device in accordance with some embodiments of the present disclosure.

FIG. 10 illustrates an example method 1000 of communication implemented at a network device in accordance with some embodiments of the present disclosure. For example, the method 1000 may be performed at the network device 120 as shown in FIG. 1. For the purpose of discussion, in the following, the method 1000 will be described with reference to FIG. 1. It is to be understood that the method 1000 may include additional blocks not shown and/or may omit some blocks as shown, and the scope of the present disclosure is not limited in this regard.

At block 1010, the network device 120 transmits, to the terminal device 110, an indication on whether one of a first mode and a second mode of PUCCH carrier switching is enabled for the terminal device, the first mode being based on a dynamic configuration in DCI, the second mode being based on an RRC configuration.

In some embodiments, the indication may indicate at least one of the following: the first mode is enabled; the second mode is enabled; or the first and second modes are simultaneously disabled.

In some embodiments, the indication may indicate at least one of the following: the first and second modes are simultaneously enabled; or the first and second modes are simultaneously disabled.

In some embodiments, the indication may comprise a first indication and a second indication. The first indication indicates at least one of the following: at least one of the first mode or the second mode is enabled; or the first and second modes are simultaneously disabled. The second indication indicates at least one of the following: the first mode is enabled; the second mode is enabled; or the first and second modes are simultaneously enabled.

Figure 11:
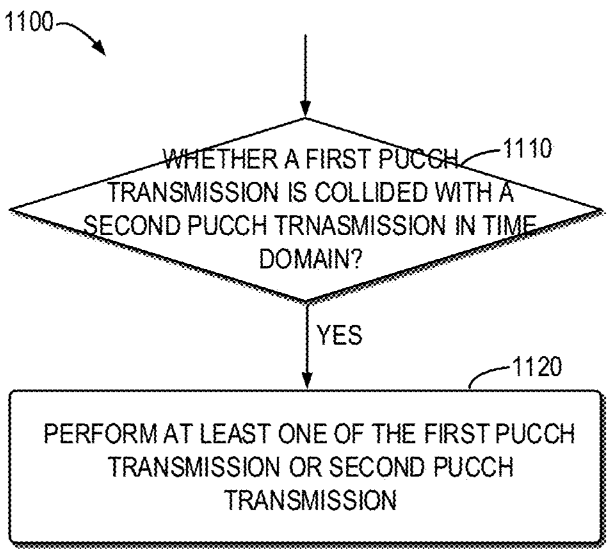
FIG. 11 illustrates another example method of communication implemented at a terminal device in accordance with some embodiments of the present disclosure.

FIG. 11 illustrates an example method 1100 of communication implemented at a terminal device in accordance with some embodiments of the present disclosure. For example, the method 1100 may be performed at the terminal device 110 as shown in FIG. 1. For the purpose of discussion, in the following, the method 1100 will be described with reference to FIG. 1. It is to be understood that the method 1100 may include additional blocks not shown and/or may omit some blocks as shown, and the scope of the present disclosure is not limited in this regard.

At block 1110, the terminal device 110 determines whether a first PUCCH transmission on a first cell is collided with a second PUCCH transmission on a second cell in time domain, the first PUCCH transmission being for a first HARQ feedback for a set of first PDSCH transmissions that are dynamically scheduled, the second PUCCH transmission being for a second HARQ feedback for a set of second PDSCH transmissions that are semi-persistently scheduled.

If determining that the first PUCCH transmission is collided with the second PUCCH transmission in time domain, the process proceeds to block 1120. At block 1120, the terminal device 110 performs at least one of the first PUCCH transmission or the second PUCCH transmission.

In some embodiments, the terminal device 110 may multiplex the second HARQ feedback onto the first PUCCH transmission and cancel the second PUCCH transmission.

In some embodiments where a Type-1 codebook or Type-2 codebook is configured for the terminal device, the multiplexing may comprise: generating a first codebook for the first HARQ feedback and a second codebook for the second HARQ feedback; and appending the first codebook after or before the second codebook.

In some embodiments where a Type-1 codebook is configured for the terminal device, the multiplexing may comprise performing the following operations for a second PUDSCH transmission in the set of second PDSCH transmissions: determining, based on a numerology of the first cell, an offset between a first slot of the first PUCCH transmission and a second slot for an ending symbol for the second PDSCH transmission; in accordance with a determination that the offset is in a set of offsets configured for the first PUCCH transmission, generating a first codebook for the first HARQ feedback; and determining, based on the offset, a position in the first codebook for placement of the second HARQ feedback; and in accordance with a determination that the offset is not in a set of offsets configured for the first PUCCH transmission, generating a first codebook for the first HARQ feedback; and appending the second HARQ feedback after the first codebook.

In some embodiments, in accordance with a determination that the offset is not in a set of offsets configured for the first PUCCH transmission, the terminal device 110 may drop the second HARQ feedback, or extend the set of offsets by adding the offset into the set of offsets.

In some embodiments, the terminal device 110 may perform the first PUCCH transmission on the first cell and delay the second PUCCH transmission on the second cell.

In some embodiments, the terminal device 110 may simultaneously perform the first PUCCH transmission on the first cell and the second PUCCH transmission on the second cell.

In some embodiments, the terminal device 110 may determine priorities of the first and second PUCCH transmissions, perform one of the first and second PUCCH transmissions with a higher priority, and drop the other of the first and second PUCCH transmissions with a lower priority.

In some embodiments, the terminal device 110 may receive, from the network device 120, an indication for performing the at least one of the first PUCCH transmission or the second PUCCH transmission, and perform the at least one of the first PUCCH transmission or the second PUCCH transmission based on the indication.

Figure 12:
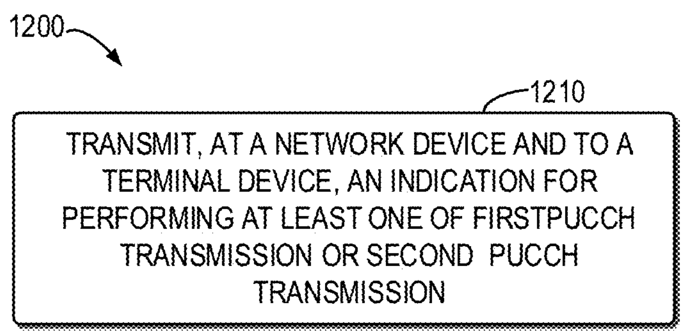
FIG. 12 illustrates another example method of communication implemented at a network device in accordance with some embodiments of the present disclosure.

FIG. 12 illustrates an example method 1200 of communication implemented at a network device in accordance with some embodiments of the present disclosure. For example, the method 1200 may be performed at the network device 120 as shown in FIG. 1. For the purpose of discussion, in the following, the method 1200 will be described with reference to FIG. 1. It is to be understood that the method 1200 may include additional blocks not shown and/or may omit some blocks as shown, and the scope of the present disclosure is not limited in this regard.

At block 1210, the network device 120 transmits, to the terminal device 110, an indication for performing at least one of a first PUCCH transmission on a first cell or a second PUCCH transmission on a second cell, the first PUCCH transmission on the first cell being collided with the second PUCCH transmission on the second cell in time domain, the first PUCCH transmission being for a first HARQ feedback for a set of first PDSCH transmissions that are dynamically scheduled, the second PUCCH transmission being for a second HARQ feedback for a set of second PDSCH transmissions that are semi-persistently scheduled.

Figure 13:
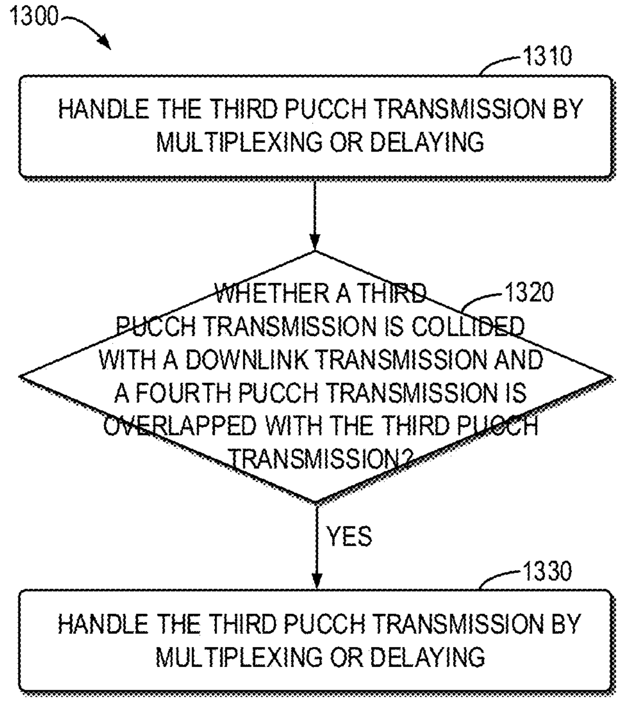
FIG. 13 illustrates still another example method of communication implemented at a terminal device in accordance with some embodiments of the present disclosure.

FIG. 13 illustrates an example method 1300 of communication implemented at a terminal device in accordance with some embodiments of the present disclosure. For example, the method 1300 may be performed at the terminal device 110 as shown in FIG. 1. For the purpose of discussion, in the following, the method 1100 will be described with reference to FIG. 1. It is to be understood that the method 1100 may include additional blocks not shown and/or may omit some blocks as shown, and the scope of the present disclosure is not limited in this regard.

At block 1310, the terminal device 110 receives, from the network device 120, a configuration for dynamic carrier switch and SPS HARQ deferral for the terminal device 110.

At block 1320, the terminal device 110 determines whether a third PUCCH transmission on a third cell is collided with a downlink transmission/symbol and that a fourth PUCCH transmission on a fourth cell is overlapped with the third PUCCH transmission on the third cell in time domain, the third PUCCH transmission being for a third HARQ feedback for a set of third PDSCH transmissions that are semi-persistently scheduled, the fourth PUCCH transmission being for a fourth HARQ feedback for a set of fourth PDSCH transmissions that are dynamically scheduled.

If determining that the third PUCCH transmission on the third cell is unavailable and the fourth PUCCH transmission on the fourth cell is overlapped with the third PUCCH transmission on the third cell in time domain, the process proceeds to block 1330.

At block 1330, the terminal device 110 handles the third PUCCH transmission by one of the following: multiplexing the third HARQ feedback onto the fourth PUCCH transmission while cancelling the third PUCCH transmission; or delaying the third HARQ feedback to a fifth PUCCH transmission on the third cell, the fifth PUCCH transmission being available.

In some embodiments, the terminal device 110 may receive, from the network device 120, an indication indicating whether the multiplexing or the delaying is applied. If the multiplexing is applied, the terminal device 110 may handle the third PUCCH transmission by the multiplexing. If the delaying is applied, the terminal device 110 may handle the third PUCCH transmission by the delaying.

Figure 14:
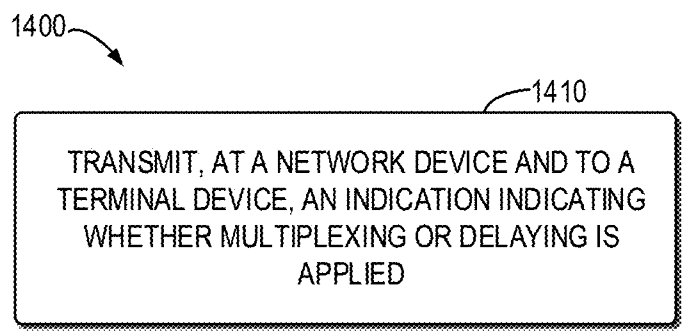
FIG. 14 illustrates still another example method of communication implemented at a network device in accordance with some embodiments of the present disclosure.

FIG. 14 illustrates an example method 1400 of communication implemented at a network device in accordance with some embodiments of the present disclosure. For example, the method 1400 may be performed at the network device 120 as shown in FIG. 1. For the purpose of discussion, in the following, the method 1400 will be described with reference to FIG. 1. It is to be understood that the method 1400 may include additional blocks not shown and/or may omit some blocks as shown, and the scope of the present disclosure is not limited in this regard.

At block 1410, the network device 120 transmits, to the terminal device 110, an indication indicating whether multiplexing or delaying is applied when a third PUCCH transmission on a third cell is collided with a downlink transmission/symbol and a fourth PUCCH transmission on a fourth cell is overlapped with the third PUCCH transmission on the third cell in time domain in case that dynamic carrier switch and SPS HARQ deferral are configured for the terminal device 110, the third PUCCH transmission being for a third HARQ feedback for a set of third PDSCH transmissions that are semi-persistently scheduled, the fourth PUCCH transmission being for a fourth HARQ feedback for a set of fourth PDSCH transmissions that are dynamically scheduled.

In some embodiments, the multiplexing comprises multiplexing the third HARQ feedback onto the fourth PUCCH transmission while cancelling the third PUCCH transmission, and the delaying comprises delaying the third HARQ feedback to a fifth PUCCH transmission on the third cell, the fifth PUCCH transmission being available.

Example Implementation of Device

Figure 15:
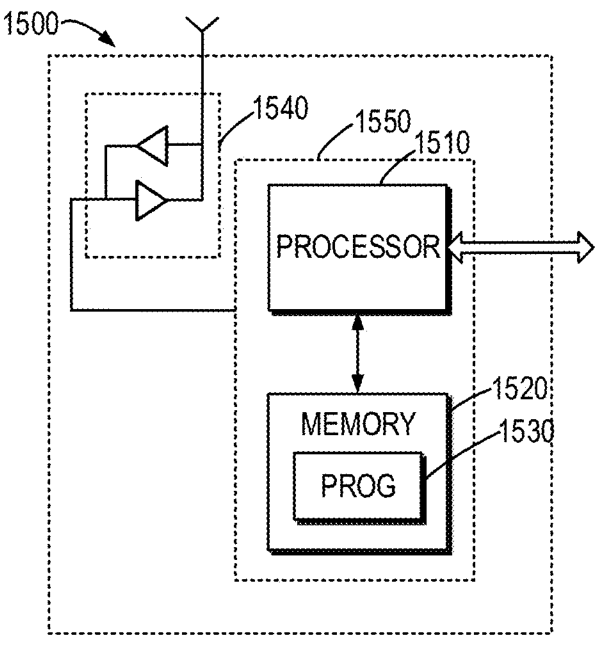
FIG. 15 is a simplified block diagram of a device that is suitable for implementing embodiments of the present disclosure.

FIG. 15 is a simplified block diagram of a device 1500 that is suitable for implementing embodiments of the present disclosure. The device 1500 can be considered as a further example implementation of the terminal device 110 or the network device 120 as shown in FIG. 1. Accordingly, the device 1500 can be implemented at or as at least a part of the terminal device 110 or the network device 120.

As shown, the device 1500 includes a processor 1510, a memory 1520 coupled to the processor 1510, a suitable transmitter (TX) and receiver (RX) 1540 coupled to the processor 1510, and a communication interface coupled to the TX/RX 1540. The memory 1510 stores at least a part of a program 1530. The TX/RX 1540 is for bidirectional communications. The TX/RX 1540 has at least one antenna to facilitate communication, though in practice an Access Node mentioned in this application may have several ones.

The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 1530 is assumed to include program instructions that, when executed by the associated processor 1510, enable the device 1500 to operate in accordance with the embodiments of the present disclosure, as discussed herein with reference to FIGS. 1 to 14. The embodiments herein may be implemented by computer software executable by the processor 1510 of the device 1500, or by hardware, or by a combination of software and hardware. The processor 1510 may be configured to implement various embodiments of the present disclosure. Furthermore, a combination of the processor 1510 and memory 1520 may form processing means 1550 adapted to implement various embodiments of the present disclosure.

The memory 1520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1520 is shown in the device 1500, there may be several physically distinct memory modules in the device 1500. The processor 1510 may be of any type suitable to the local technical network, and may include one or more of general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

In some embodiments, a terminal device comprises circuitry configured to: receive, from a network device, an indication on whether one of a first mode and a second mode of PUCCH carrier switching is enabled, the first mode being based on a dynamic configuration in DCI, the second mode being based on an RRC configuration; and in accordance with a determination that the one of the first mode and the second mode is enabled, perform the PUCCH carrier switching for a PUCCH transmission to be processed.

In some embodiments, the circuitry may be configured to perform the PUCCH carrier switching by performing the PUCCH carrier switching for the PUCCH transmission in the first mode in accordance with a determination that the PUCCH transmission is dynamically scheduled; and performing the PUCCH carrier switching for the PUCCH transmission in the second mode in accordance with a determination that the PUCCH transmission is semi-statically configured.

In some embodiments, the circuitry may be configured to: receive, from the network device, the indication indicating at least one of the following: the first mode is enabled; the second mode is enabled; or the first and second modes are simultaneously disabled.

In some embodiments, the circuitry may be configured to: receive, from the network device, the indication indicating at least one of the following: the first and second modes are simultaneously enabled; or the first and second modes are simultaneously disabled.

In some embodiments, the circuitry may be configured to: receive, from the network device, the indication comprising a first indication and a second indication, wherein the first indication indicates at least one of the following: at least one of the first mode or the second mode is enabled; or the first and second modes are simultaneously disabled, and wherein the second indication indicates at least one of the following: the first mode is enabled; the second mode is enabled; or the first and second modes are simultaneously enabled.

In some embodiments, the circuitry may be further configured to perform no PUCCH carrier switching for the PUCCH transmission to be processed in accordance with a determination that the first mode and second mode are simultaneously disabled.

In some embodiments, the circuitry may be configured to: in accordance with a determination that the first mode is enabled or the second mode is enabled, perform the following operations: in accordance with a determination that the first mode is enabled and the PUCCH transmission is dynamically scheduled, performing the PUCCH carrier switching for the PUCCH transmission in the first mode; in accordance with a determination that the first mode is enabled and the PUCCH transmission is semi-statically configured, performing no PUCCH carrier switching for the PUCCH transmission; and in accordance with a determination that the second mode is enabled and the PUCCH transmission is dynamically scheduled or semi-statically configured, performing the PUCCH carrier switching for the PUCCH transmission in the second mode.

In some embodiments, the circuitry may be configured to: in accordance with a determination that the first and second modes are simultaneously enabled, perform the following operations: in accordance with a determination that the PUCCH transmission is dynamically scheduled, performing the PUCCH carrier switching for the PUCCH transmission in the first mode; and in accordance with a determination that the PUCCH transmission is semi-statically configured, performing the PUCCH carrier switching for the PUCCH transmission in the second mode.

In some embodiments, the circuitry may be further configured to: in accordance with a determination that the PUCCH transmission is dynamically scheduled in DCI format 1_0, perform the PUCCH carrier switching for the PUCCH transmission by treating the PUCCH transmission as a semi-statically configured PUCCH transmission.

In some embodiments, a network device comprises circuitry configured to: transmit, to a terminal device, an indication on whether one of a first mode and a second mode of PUCCH carrier switching is enabled for the terminal device, the first mode being based on a dynamic configuration in DCI, the second mode being based on an RRC configuration.

In some embodiments, the indication indicates at least one of the following: the first mode is enabled; the second mode is enabled; or the first and second modes are simultaneously disabled.

In some embodiments, the indication indicates at least one of the following: the first and second modes are simultaneously enabled; or the first and second modes are simultaneously disabled.

In some embodiments, the indication comprises a first indication and a second indication, wherein the first indication indicates at least one of the following: at least one of the first mode or the second mode is enabled; or the first and second modes are simultaneously disabled, and wherein the second indication indicates at least one of the following: the first mode is enabled; the second mode is enabled; or the first and second modes are simultaneously enabled.

In some embodiments, a terminal device comprises a circuitry configured to: in accordance with a determination that a first PUCCH transmission on a first cell is collided with a second PUCCH transmission on a second cell in time domain, perform at least one of the first PUCCH transmission or the second PUCCH transmission, the first PUCCH transmission being for a first HARQ feedback for a set of first PDSCH transmissions that are dynamically scheduled, the second PUCCH transmission being for a second HARQ feedback for a set of second PDSCH transmissions that are semi-persistently scheduled. In some embodiments, the circuitry may be configured to perform at least one of the first PUCCH transmission or the second PUCCH transmission by: multiplexing the second HARQ feedback onto the first PUCCH transmission; and cancelling the second PUCCH transmission.

In some embodiments where a Type-1 codebook or Type-2 codebook is configured for the terminal device, the multiplexing comprises: generating a first codebook for the first HARQ feedback and a second codebook for the second HARQ feedback; and appending the first codebook after or before the second codebook.

In some embodiments where a Type-1 codebook is configured for the terminal device, the multiplexing comprises perform the following operations for a second PDSCH transmission in the set of second PDSCH transmissions: determining, based on a numerology of the first cell, an offset between a first slot of the first PUCCH transmission and a second slot for an ending symbol for the second PDSCH transmission; in accordance with a determination that the offset is in a set of offsets configured for the first PUCCH transmission, generating a first codebook for the first HARQ feedback; and determining, based on the offset, a position in the first codebook for placement of the second HARQ feedback; and in accordance with a determination that the offset is not in a set of offsets configured for the first PUCCH transmission, generating a first codebook for the first HARQ feedback; and appending the second HARQ feedback after the first codebook.

In some embodiments, the circuitry may be further configured to: in accordance with a determination that the offset is not in a set of offsets configured for the first PUCCH transmission, drop the second HARQ feedback, or extend the set of offsets by adding the offset into the set of offsets.

In some embodiments, the circuitry may be configured to perform at least one of the first PUCCH transmission or the second PUCCH transmission by: performing the first PUCCH transmission on the first cell; and delaying the second PUCCH transmission on the second cell.

In some embodiments, the circuitry may be configured to perform at least one of the first PUCCH transmission or the second PUCCH transmission by: simultaneously performing the first PUCCH transmission on the first cell and the second PUCCH transmission on the second cell.

In some embodiments, the circuitry may be configured to perform at least one of the first PUCCH transmission or the second PUCCH transmission by: determining priorities of the first and second PUCCH transmissions; performing one of the first and second PUCCH transmissions with a higher priority; and dropping the other of the first and second PUCCH transmissions with a lower priority.

In some embodiments, the circuitry may be configured to perform at least one of the first PUCCH transmission or the second PUCCH transmission by: receiving, from a network device, an indication for performing the at least one of the first PUCCH transmission or the second PUCCH transmission; and performing the at least one of the first PUCCH transmission or the second PUCCH transmission based on the indication.

In some embodiments, a network device comprises a circuitry configured to: transmit, to a terminal device, an indication for performing at least one of a first PUCCH transmission on a first cell or a second PUCCH transmission on a second cell, the first PUCCH transmission on the first cell being collided with the second PUCCH transmission on the second cell in time domain, the first PUCCH transmission being for a first HARQ feedback for a set of first PDSCH transmissions that are dynamically scheduled, the second PUCCH transmission being for a second HARQ feedback for a set of second PDSCH transmissions that are semi-persistently scheduled.

In some embodiments, a terminal device comprises a circuitry configured to: receive, at a terminal device and from a network device, a configuration for dynamic carrier switch and SPS HARQ deferral for the terminal device; and in accordance with a determination that a third PUCCH transmission on a third cell is collided with a downlink transmission/symbol and that a fourth PUCCH transmission on a fourth cell is overlapped with the third PUCCH transmission on the third cell in time domain, the third PUCCH transmission being for a third HARQ feedback for a set of third PDSCH transmissions that are semi-persistently scheduled, the fourth PUCCH transmission being for a fourth HARQ feedback for a set of fourth PDSCH transmissions that are dynamically scheduled, handle the third PUCCH transmission by one of the following: multiplexing the third HARQ feedback onto the fourth PUCCH transmission while cancelling the third PUCCH transmission; or delaying the third HARQ feedback to a fifth PUCCH transmission on the third cell, the fifth PUCCH transmission being available.

In some embodiments, the circuitry may be configured to handle the third PUCCH transmission by receiving, from a network device, an indication indicating whether the multiplexing or the delaying is applied; in accordance with a determination that the multiplexing is applied, handling the third PUCCH transmission by the multiplexing; and in accordance with a determination that the delaying is applied, handling the third PUCCH transmission by the delaying.

In some embodiments, a network device comprises a circuitry configured to: transmit, to a terminal device, an indication indicating whether multiplexing or delaying is enabled when a third PUCCH transmission on a third cell is collided with a downlink transmission/symbol and a fourth PUCCH transmission on a fourth cell is overlapped with the third PUCCH transmission on the third cell in time domain in case that dynamic carrier switch and semi-persistent scheduling SPS HARQ deferral are configured for the terminal device, the third PUCCH transmission being for a third HARQ feedback for a set of third PDSCH transmissions that are semi-persistently scheduled, the fourth PUCCH transmission being for a fourth HARQ feedback for a set of fourth PDSCH transmissions that are dynamically scheduled, wherein the multiplexing comprises multiplexing the third HARQ feedback onto the fourth PUCCH transmission while cancelling the third PUCCH transmission, and the delaying comprises delaying the third HARQ feedback to a fifth PUCCH transmission on the third cell, the fifth PUCCH transmission being available.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 14. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a terminal device, comprising:

receiving, from a network device, a first configuration for semi-persistent scheduling (SPS) hybrid automatic repeat request (HARQ) deferral;

determining that a first physical uplink control channel (PUCCH) transmission is overlapped with a second PUCCH transmission in a time domain, and the first PUCCH transmission is overlapped with a downlink symbol, wherein the first PUCCH transmission is with HARQ-acknowledgement (HARQ-ACK) information for SPS physical downlink shared channel (PDSCH) receptions;

determining a third PUCCH transmission associated with the HARQ-ACK information for the SPS PDSCH receptions based on the first configuration; and transmitting the third PUCCH transmission with the HARQ-ACK information for the SPS PDSCH receptions on a primary cell in a case where PUCCH cell switching based on a dynamic indication is enabled.

2. A method of communication performed by a network device, comprising:

transmitting, to a terminal device, a first configuration for semi-persistent scheduling (SPS) hybrid automatic repeat request (HARQ) deferral, wherein a first physical uplink control channel (PUCCH) transmission is overlapped with a second PUCCH transmission in a time domain, the first PUCCH transmission is overlapped with a downlink symbol, the first PUCCH transmission is with HARQ-acknowledgement (HARQ-ACK) information for SPS physical downlink shared channel (PDSCH) receptions, the first configuration is configured for use for determination of a third PUCCH transmission associated with the HARQ-ACK information for the SPS PDSCH receptions; and receiving the third PUCCH transmission with the HARQ-ACK information for the SPS PDSCH receptions on a primary cell in a case where PUCCH cell switching based on a dynamic indication is enabled.

3. A terminal device, comprising:

a receiver; and at least one processor configured to cause the terminal device to:

control the receiver to receive, from a network device, a first configuration for semi-persistent scheduling (SPS) hybrid automatic repeat request (HARQ) deferral;

determine that a first physical uplink control channel (PUCCH) transmission is overlapped with a second PUCCH transmission in a time domain, and the first PUCCH transmission is overlapped with a downlink symbol, wherein the first PUCCH transmission is with HARQ-acknowledgement (HARQ-ACK) information for SPS physical downlink shared channel (PDSCH) receptions;

determine a third PUCCH transmission associated with the HARQ-ACK information for the SPS PDSCH receptions based on the first configuration; and transmit the third PUCCH transmission with the HARQ-ACK information for the SPS PDSCH receptions on a primary cell in a case where PUCCH cell switching based on a dynamic indication is enabled.

4. A network device, comprising:

a transmitter; and at least one processor configured to cause the network device to:

control the transmitter to transmit, to a terminal device, a first configuration for semi-persistent scheduling (SPS) hybrid automatic repeat request (HARQ) deferral, wherein a first physical uplink control channel (PUCCH) transmission is overlapped with a second PUCCH transmission in a time domain, the first PUCCH transmission is overlapped with a downlink symbol, the first PUCCH transmission is with HARQ-acknowledgement (HARQ-ACK) information for SPS physical downlink shared channel (PDSCH) receptions, the first configuration is used for determination of a third PUCCH transmission associated with the HARQ-ACK information for the SPS PDSCH receptions; and receive the third PUCCH transmission with the HARQ-ACK information for the SPS PDSCH receptions on a primary cell in a case where PUCCH cell switching based on a dynamic indication is enabled.

* * * * *